United States Patent
Kim et al.

(10) Patent No.: US 9,413,967 B2
(45) Date of Patent: Aug. 9, 2016

(54) APPARATUS AND METHOD FOR PHOTOGRAPHING AN IMAGE USING PHOTOGRAPHING GUIDE

(71) Applicant: Samsung Electronics Co., Ltd., Gyeonggi-do (KR)

(72) Inventors: Kyunghwa Kim, Seoul (KR); Seonhwa Kim, Seoul (KR); Heejin Kim, Seoul (KR); Mijung Park, Gyeonggi-do (KR); Seockhyun Yu, Seoul (KR); Joah Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/188,013

(22) Filed: Feb. 24, 2014

(65) Prior Publication Data

US 2014/0240544 A1    Aug. 28, 2014

(30) Foreign Application Priority Data

Feb. 22, 2013 (KR) .................. 10-2013-0019425

(51) Int. Cl.
*H04N 5/232* (2006.01)

(52) U.S. Cl.
CPC ....... *H04N 5/23293* (2013.01); *H04N 5/23219* (2013.01); *H04N 5/23222* (2013.01)

(58) Field of Classification Search
CPC .......... H04N 5/23219; H04N 5/23222; H04N 5/23293; G06K 9/00221
See application file for complete search history.

(56) References Cited

U.S. PATENT DOCUMENTS

| | | | |
|---|---|---|---|
| 8,698,937 B2 * | 4/2014 | Jeong .................. | 348/333.03 |
| 8,913,176 B2 * | 12/2014 | Chun et al. .............. | 348/345 |
| 2007/0002157 A1 * | 1/2007 | Shintani et al. .......... | 348/333.06 |
| 2007/0292038 A1 * | 12/2007 | Takemoto .......... | G06K 9/00228 382/240 |
| 2008/0297617 A1 * | 12/2008 | Jeong .................. | 348/222.1 |
| 2010/0315542 A1 * | 12/2010 | Yoshino ................ | 348/333.01 |
| 2011/0267530 A1 * | 11/2011 | Chun .................. | 348/333.11 |
| 2012/0062768 A1 * | 3/2012 | Arai ...................... | 348/239 |
| 2015/0029382 A1 * | 1/2015 | Chun et al. ............. | 348/333.03 |

* cited by examiner

*Primary Examiner* — Nicholas Giles
(74) *Attorney, Agent, or Firm* — The Farrell Law Firm, P.C.

(57) ABSTRACT

A method for photographing an image in a device having a camera according to the present invention includes displaying a preview image, identifying a face size of a person included in the preview image, displaying a guide in the preview image, according to a photographing type determined by the identified face size, and photographing and storing an image by capturing the image output by the camera when photographing is requested.

15 Claims, 27 Drawing Sheets

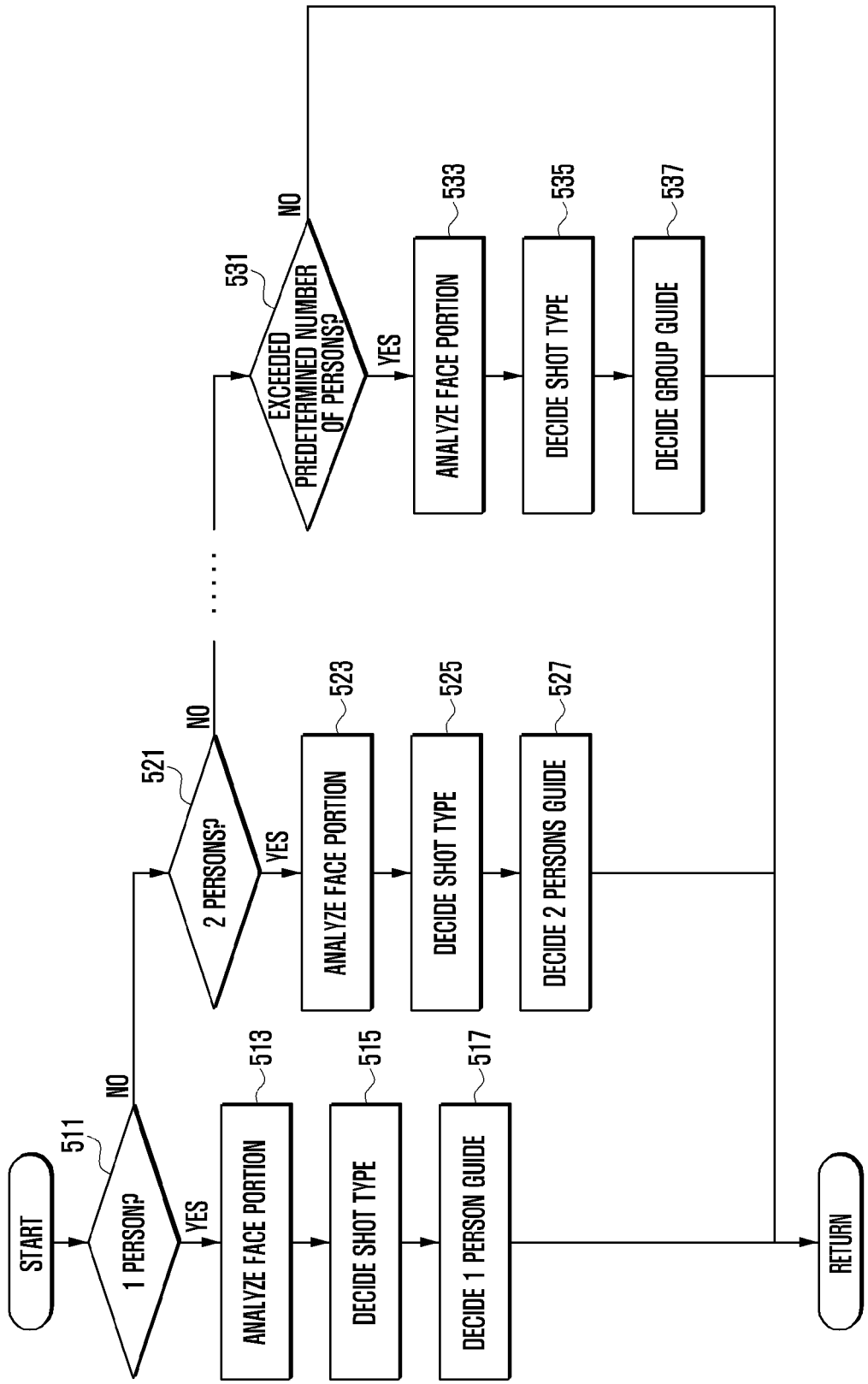

APPARATUS AND METHOD FOR PHOTOGRAPHING AN IMAGE USING PHOTOGRAPHING GUIDE

PRIORITY

This application claims priority under 35 U.S.C. §119(a) to a Korean patent application filed on Feb. 22, 2013 in the Korean Intellectual Property Office and assigned Serial No. 10-2013-0019425, the contents of which are incorporated herein by reference.

BACKGROUND OF THE INVENTION

1. Field of the Invention

The present invention relates generally to an apparatus and a method for photographing an image in a device including a camera and, more particularly, to an apparatus and a method for photographing an image in a device including a camera by displaying a guide.

2. Description of the Related Art

Camera devices or portable terminals including cameras provide various services for photographing an image. The device including a camera provides a photographing mode corresponding to, for example, a portrait, landscape, close-up, travel, snap, and night photographing, for which composition of a subject is very important to achieving high quality photographs. The framing indicates composing an image by properly adjusting a location of a subject in a screen, when photographing the image.

Framing of the subject may be performed in various manners according to the size of subject. For example, in photographing a portrait, the framing may include a full shot photographing the entire body of a person, a knee shot (or medium shot) photographing from a person's knees to their face, a half shot (or waist shot) photographing from a person's waist to their face, a bust shot photographing from a person's bust to their face, and a close-up shot (or head shot) photographing a person's face or another specific portion of the person.

Accordingly, a user may take a photo by using various framings for a subject. However, it is difficult for a beginner to change the framing of a subject while photographing.

SUMMARY OF THE INVENTION

The present invention discloses an apparatus and a method for photographing an image which analyzes a preview image in a device including a camera, and displays a photographing guide according the analyzed image. The camera device, according to an embodiment of the present invention provides a practical and useful photographing guide by analyzing a displayed image and providing a user with the optimal guide and information on whether a subject is correctly positioned according to the provided guide.

A method for photographing an image in a device having a camera according to an embodiment of the present invention includes displaying a preview image, identifying a face size of a person included in the preview image, displaying a guide in the preview image, according to a photographing type determined by the identified face size, and photographing and storing an image by capturing the image output by the camera, when the photographing is requested.

An apparatus for photographing an image, according to another embodiment of the present invention includes a camera configured to detect and output an image, a display unit configured to display a preview image and a guide, a storage unit configured to store a captured image, and a control unit configured to identify a face size of person included in the image output by the camera in a preview mode, to decide a photographing type according to the identified face size, to display the guide according to the determined photographing type by overlaying the guide on the preview image of the display unit, and to capture and store the image output by the camera if the photographing is requested.

BRIEF DESCRIPTION OF THE DRAWINGS

The above and other features and advantages of embodiments of the present invention will be more apparent from the following detailed description in conjunction with the accompanying drawings, in which:

FIG. 5 illustrates a procedure of determining a guide by analyzing an identified image, according to an embodiment of the present invention;

DETAILED DESCRIPTION OF EMBODIMENTS OF THE INVENTION

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted for the sake of clarity and conciseness.

A camera device of the present invention displays a photographing guide according to a composition of a subject while photographing the subject. For example, a camera device of the present invention identifies an image in a preview mode, identifies persons (such as a face and the number of persons) configured in the image, background, and/or device state, and displays a photographing guide in a preview image by determining the photographing guide according to the identified result. Accordingly, a photographer can easily take a photo by using the photographing guide displayed in the preview image.

Figure 1:
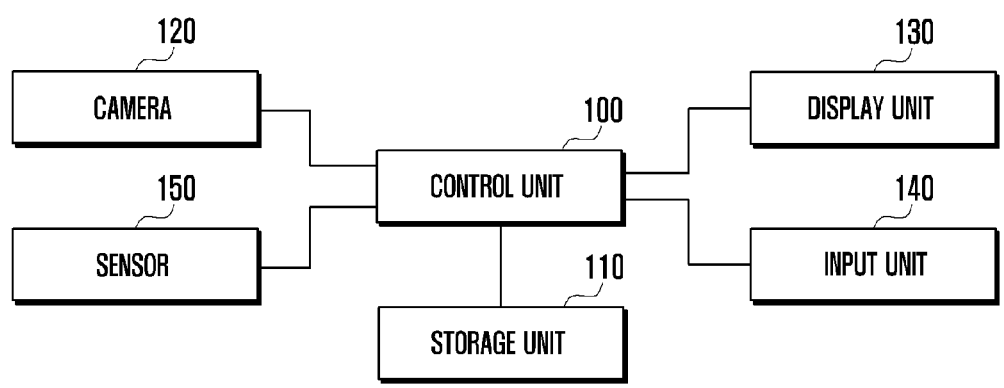
FIG. 1 illustrates a configuration of a camera device, according to an embodiment of the present invention.

FIG. 1 illustrates a configuration of a camera device, according to an embodiment of the present invention.

The camera device of FIG. 1 includes a control unit 100, a storage unit 110, a camera 120, a display unit 130, an input unit 140, and a sensor 150.

The camera 120 photographs a preview image and a capture image under the control of a control unit 100.

The control unit 100 controls the general operation of the camera device. The control unit 100 controls a guide-photographing mode, in which the control unit 100 controls the camera 120 to identify states of the subject and device, displays a photographing guide in a preview image by determining the photographing guide according to the identified result, performs a focusing operation if the subject is located in a guide area, and stores an image obtained by the camera 120 when a user requests photographing.

The storage unit 110 may be equipped with a program memory (not shown) for storing an operation program and programs according to the present invention, and a data memory (not shown) for storing photographed images. The storage unit 110 further stores guide frames displayed according to the result of the identified subject, in an embodiment of the present invention.

The display unit 130 displays an image photographed under the control of the control unit 100. The display unit 130 can display a guide by overlaying the guide on a preview image in a guide-photographing mode under the control of the control unit 100. The display unit 130 may be a Liquid Crystal Display (LCD) or an Organic Light Emitting Diode (OLED) display. The input unit 140 generates signals for controlling the photographing of the camera device. The display unit 130 and the input unit 140 may be integrated into a touch screen. The sensor 150 may be equipped with at least one sensor detecting a rotation, inclination, and/or movement of the device. The sensor 150 may include an acceleration sensor, gyro sensor, and geomagnetic sensor, for example.

When a user selects a guide-photographing mode through the input unit 140 in a setting mode or when driving the camera 120, the control unit 100 detects this selection and identifies a face area of person, landscape, and/or device state of a preview image photographed by the camera 120. The face recognition includes a face area extraction for identifying where a face is located in a photo, and a face recognition for determining whose face is found in the extracted face area. The face area extraction may use information such as a brightness, movement, color, and location estimation of eyes (or nose, mouth, and ears) to distinguish the face from a background. The face area recognition may further use diversified information corresponding to various factors in order to correctly extract the face area by combining and compensating more than one type of information. The control unit 100 includes a face recognizer having a face area extraction function that distinguishes a face location in a preview image.

The control unit 100 determines the number of persons in an image by identifying faces, and analyzes the face sizes of the persons. The control unit 100 may determine a photographing type (shot type) according to the result of identifying of the number of persons and face sizes. The photographing type may include a full shot, knee shot, half shot (waist shot or torso shot), bust shot, and close-up shot, as previously described. Subsequently, the control unit 100 determines a photographing guide according to the analyzed number of persons and face sizes, and displays the determined guide by overlaying the guide on the preview image in the display unit 130.

The guide can also be determined and displayed by using face characteristics. For example, the control unit 100 may distinguish a sex according to the size of person and shape of hairs included in an image, and provide a different type of guide individually for a man and woman if the sex is distinguished. If more than one person is included in the image, the control unit 100 may distinguish an adult from a child by identifying the sizes of persons, and provide guides of different types for the adult and child.

When displaying a photographing guide in a preview image, the control unit 100 detects when a human subject is located in the photographing guide, and performs a focusing operation by controlling the camera 120. If the focusing is performed, the control unit 100 may display in the display unit 130 that the focusing has been completed. If a user presses a photographing button (shutter switch on) in the above state, the control unit 100 captures and processes an image, and stores the image in the storage unit 110 as a still image.

Figure 2:
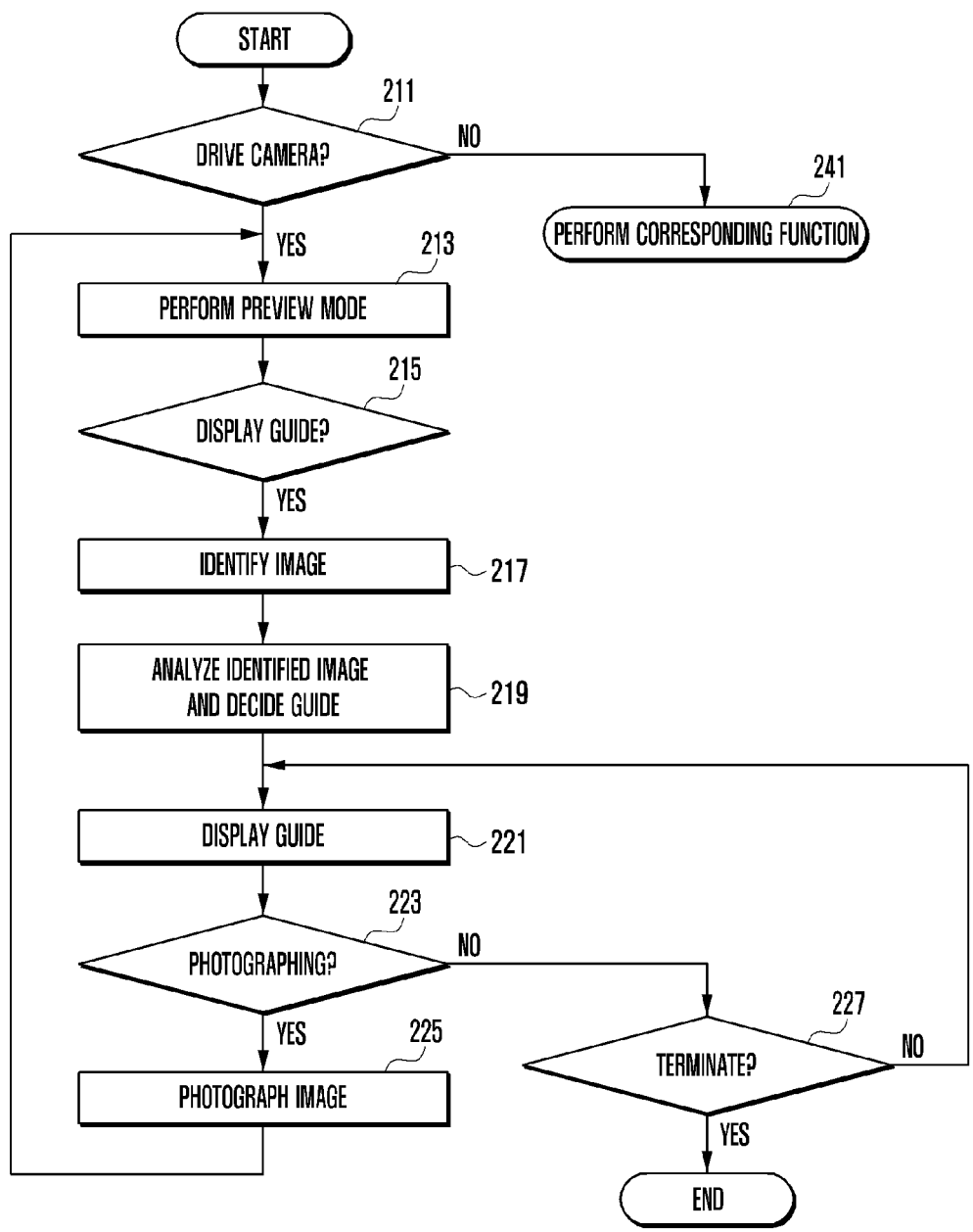
FIG. 2 illustrates a procedure of performing a guide-photographing mode in a camera device, according to an embodiment of the present invention.

FIG. 2 illustrates a procedure of performing a guide-photographing mode in a camera device, according to an embodiment of the present invention. FIGS. 3A to 3E illustrate a method of determining a guide by identifying and analyzing a subject image in a guide-photographing mode, according to an embodiment of the present invention.

Referring to FIG. 2, the control unit 100 detects when driving of the camera 120 is requested in step 211, and performs a preview mode in step 213, in which the control unit 100 processes an image detected by the camera 120 and displays the image in the display unit 130. When performing the preview mode, the control unit 100 checks whether a guide-photographing mode is set in step 215. The guide-photographing mode may be set in a setting mode as well as in the preview mode.

The control unit 100 detects when the guide-photographing mode is set in step 215, and sets a guide by identifying and analyzing a preview image currently photographed by the camera 120 in step 217. For the guide settings, the control unit 100 identifies an image output by the camera 120 at step 217. The image recognition is performed by identifying faces of persons, landscape, and/or a device state of the image, and the number of persons and face sizes are identified when the face is identified. Subsequently, the control unit 100 determines a photographing guide according to the identified number of persons and face sizes in step 219.

The photographing guide may use a background and device states. The recognition of background is performed to identify an environment of a subject or object, and colors of the background image (for example, blue, sunset, white, and green) can be identified. The recognition of background may also identify a background image (sceneries of indoors, and outdoors such as a seashore, mountain, garden, night view, water, sunset, and snow). The device state may include an inclination and/or rotation of the camera device, and the control unit 100 may determine an image display mode (landscape mode or portrait mode) according to the rotation of the device.

The control unit 100 may display a guide according to the identified number of persons and face sizes at step 221. Specifically, the object and category (shot type) of a photo may vary according to the identified number of persons and face sizes Therefore, the photographing type (shot type) of the guide may be determined by combinations of the number of persons and face sizes. Alternatively, the photographing type may be determined according to a face portion included in a preview image.

Figure 3A:
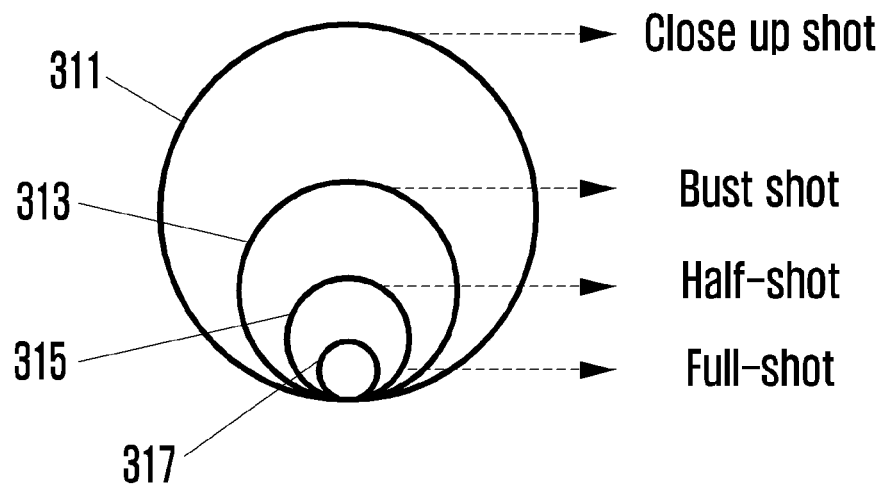
FIGS. 3A to 3E illustrate a method of determining a guide by identifying and analyzing a subject image in a guide-photographing mode, according to an embodiment of the present invention.
Figure 3B:
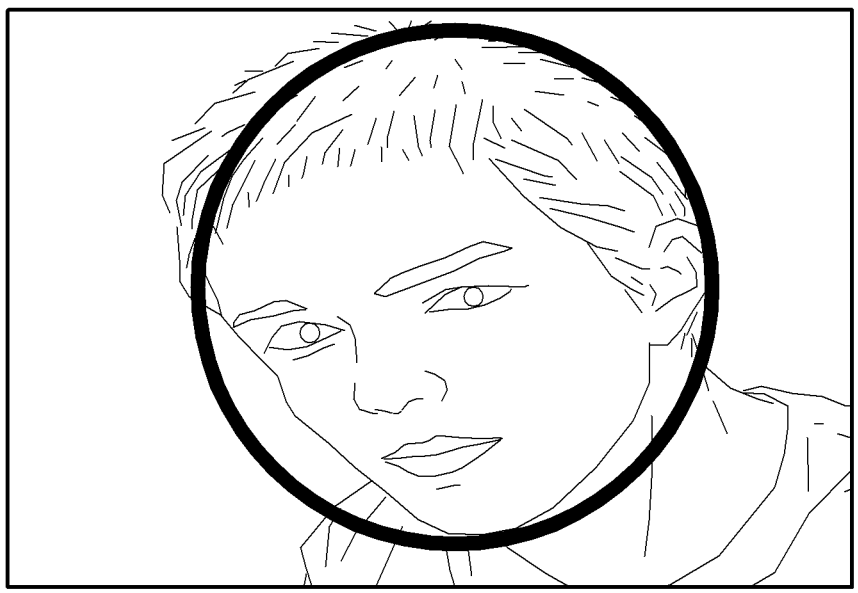
Figure 3C:
Figure 3D:
Figure 3E:
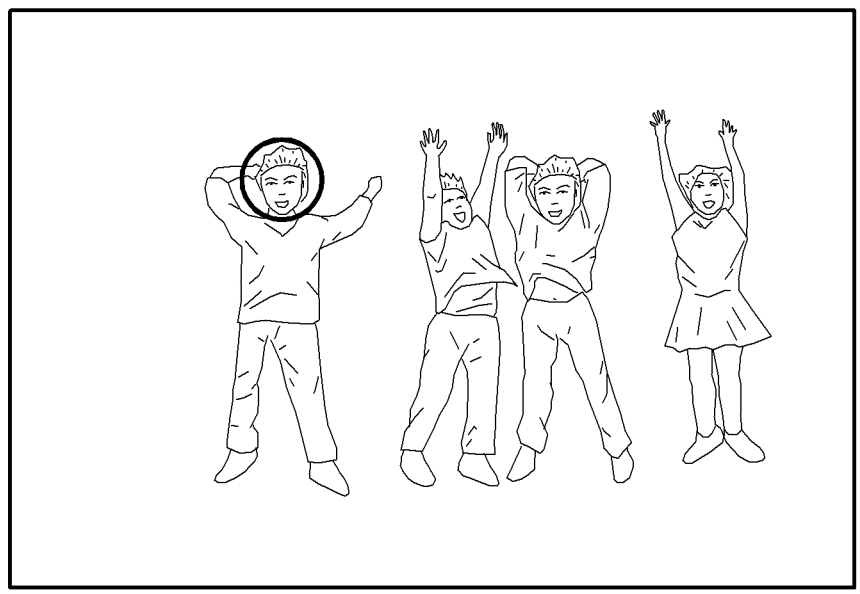

As shown in reference numerals 311 to 317 of FIG. 3A, if a face portion of person included in an image is found, persons in the image can be identified. If the face occupies N1% (for example, about 60%) of the entire screen as shown in reference numeral 311 of FIG. 3A, the image may be a close-up photo as shown in FIG. 3B. In this case, the photographing is for a human oriented photo, and the background is not considered. If the face occupies N2% (for example, about 40%) of the entire screen as shown in reference numeral 313 of FIG. 3A, the image may be a bust shot photo as shown in FIG. 3C and the photographing is for a relatively human oriented photo. If the face occupies N3% (for example, about 25%) of the entire screen as shown in reference numeral 315 of FIG. 3A, the image may be a half shot photo as shown in FIG. 3D and the photographing is for a photo compromising a person and a background. If the face occupies N4% (for example, about 10%) of the entire screen as shown in reference numeral 317 of FIG. 3A, the image may be a bust shot photo as shown in FIG. 3E and the photographing is for a background oriented photo.

As the face portion occupied in a personal image increases, the face portion may vary proportionally to the number of persons. When the face portion of persons exceeds N1%, the photographing may be a bust shot or half shot according the number of persons in the photo. If the number of persons is greater than 1, the face portion may increase. Therefore, it is desirable to determine the photographing guide by identifying and analyzing the face portion and the number of persons.

A guide image may be displayed as a 1 person, 2 persons, 3 persons . . . , or a group guide, and the size of the guide may be determined according to the analyzed face sizes such as the entire body, half body, or face area. Hereinafter, it assumed that an individual guide is provided if the number of persons is 1 or 2, and a group guide is provided if the number of persons is greater than 2. Further, it is assumed that a guide is displayed according to a face size and a photographing mode, such as a full shot photographing the entire body of a person, a knee shot (or medium shot) photographing from a person's knees to their face, a half shot (or waist shot) photographing from a person's waist to their face, a bust shot photographing from a person's bust to their face, and a close-up shot (or head shot) photographing a person's face or another specific portion of the person. The control unit 100 determines an image display mode by analyzing an output of the sensor 150, and the guide may be determined according to a landscape mode or a portrait mode.

After determining the photographing guide by identifying and analyzing a preview image obtained by the camera 120, the control unit 100 displays the photographing guide by overlaying the guide on the preview image of the display unit 130 in step 221. If the user adjusts a location of subject by operating the camera 120 according to the displayed photographing guide, the subject can be located in the photographing guide displayed on the image output by the camera 120. If the subject is located in the guide, the control unit 100 controls the camera 120 to automatically focus on the subject.

The control unit 100 detects when photographing is requested in the above state, in step 223, and captures an image in step 225. The request for photographing can be set to a manual or automatic mode. If the request for photographing is set to the automatic mode, the control unit 100 can perform an automatic photographing if the subject is located and focused in the guide. If the request for photographing is set to the manual mode, the control unit 100 performs a photographing operation when the user switches on a shutter.

While performing the guide-photographing mode, the control unit 100 detects when a user requests for terminating the guide-photographing mode, and terminates the guide-photographing mode in step 227.

Figure 4:
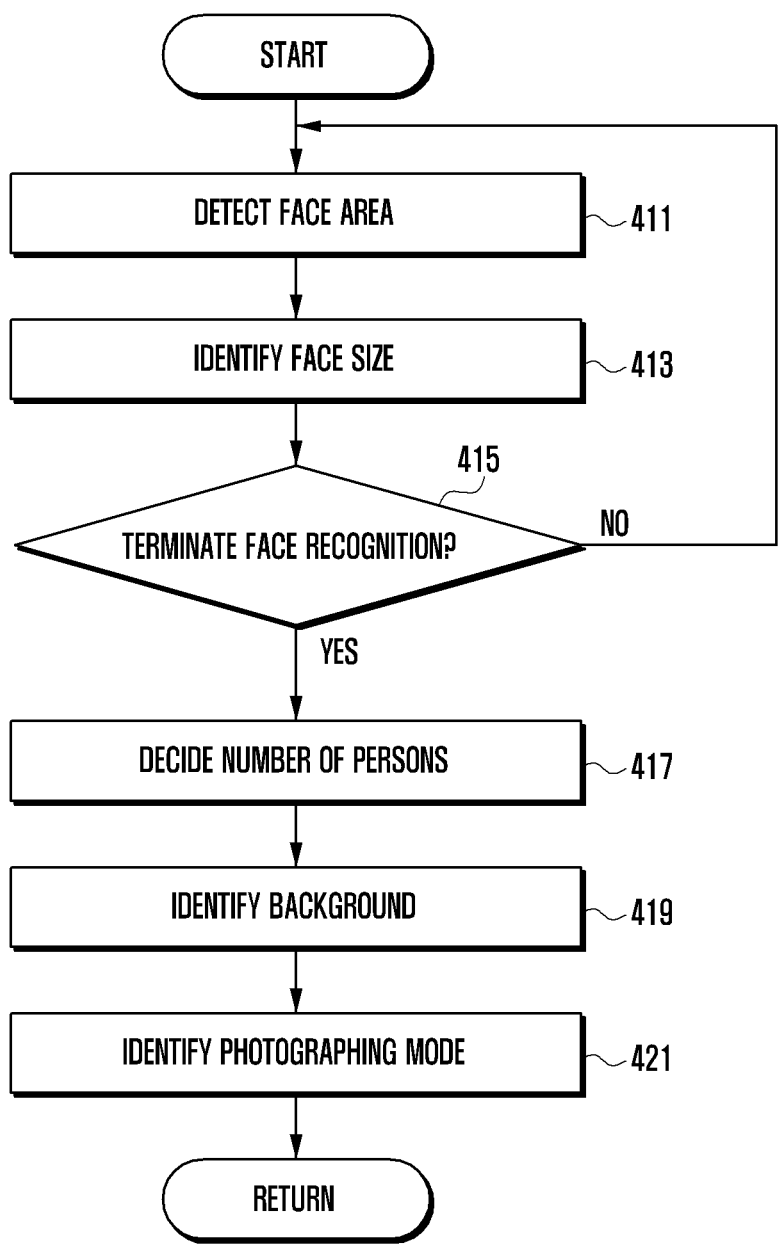
FIG. 4 illustrates a procedure of identifying a face, background, and device states of a preview image in a guide-photographing mode, according to an embodiment of the present invention.

FIG. 4 illustrates a procedure of identifying a face, background, and device states of a preview image in a guide-photographing mode, according to an embodiment of the present invention.

Referring to FIG. 4, the control unit 100 identifies the number of persons and faces of each person included in an image by performing steps 411 to 417. The control unit 100 identifies each face area and face portion (i.e., ratio of face to screen) included in the image in steps 411 to 413. The control unit 100 detects each face and face area that are identified in the above operations, in step 415, and determines the number of persons included in the image according to the number of identified faces in step 417. Subsequently, the control unit 100 identifies a background of preview image in step 419, and identifies a device state (inclination and rotation) by receiving an output of the sensor 150 in step 421. The numbers of identified faces and persons, background, and/or device state are used as parameters in determining a guide image.

As described above, the control unit 100 identifies corresponding information by dividing an image output by the camera 120 into identifiable parameters in the preview mode of a guide-photographing mode. The technology for identifying an image output by the camera 120 may include the following items. The face recognition technology may be divided into a first recognition and a second recognition. The first face recognition identifies a human face or an animal face by identifying a face area of subject included in an image. The second face recognition identifies the sizes of the identified human face or animal face as shown in FIG. 3A, in order to determine a guide by analyzing a portion of a person in a photo from the size of identified face. Photographing types (shot types) such as a full-length shot, knee shot, half shot, bust shot, and head shot can be analyzed according to the face portion as shown in FIGS. 3B to 3E. Thereby, a photographing guide can be provided according to the analyzed results and corresponding to the determined photographing type.

The face size is influenced by the number of persons. If the number of persons included in the image increases, the face portion in a screen increases correspondingly. The photographing type can vary even though the face portions are same for different numbers of persons, such as when a face portion of a person is same as a portion of a plurality of persons. Therefore, it is desirable to consider both the number of persons and the face portion when determining a photographing type.

The guide can be determined by considering a face face location. For this, the control unit 100 may determine a guide by identifying and considering the face location in a face recognition process. For example, in a photo including an adult and a child, the face location of the adult and the face location of the child may be different. Further, a background recognition technology (identifying an environment of subject/object) may be used instead of the face recognition technology.

For example, when photographing a photo by balancing a person and a background, the photo can be taken in various conditions according to a method of framing the person and background. Accordingly, the background recognition technology may be used, which may include recognition of sceneries of indoors and outdoors such as a seashore, mountain, garden, night view, water, sunset, and snow. When using the background recognition technology, a guide framing can be provided by considering the location of the background.

The guide can be determined by analyzing a device state and an image state. Generally, a landscape or portrait is used for a photographing, but the photographing may also be performed in a diaper form. In this case, the guide must be displayed according to a state of the camera device. For this, the control unit 100 can determine the guide by identifying a device state through the sensor 150 in the preview mode (i.e., identification of horizontal and vertical location, and rotation of a device).

After identifying the preview image as described above, the guide may be determined by analyzing the identified results. FIG. 5 illustrates a procedure of determining a guide by analyzing an identified image, according to an embodiment of the present invention. FIGS. 6A to 6D and FIGS. 7A to 7D illustrate examples of determining and displaying a single person guide while performing the procedure of FIG. 5.

Referring to FIGS. 5 to 7D, the control unit 100 determines a guide by analyzing identified results such as a face size, number of persons, background, and device state. If the number of persons is 1, the control unit 100 determines a photographing type according to the face size, and fixes the upper and lower sides of the determined guide. If the number of persons is 2, the control unit 100 maintains a guide distance including 2 persons, and adjusts the upper and lower sides of the guide according to the heights of the tallest of the 2 persons. If one of the persons is tall, the guide is set so that the end of the head of the tall person doesn't exceed a predetermined location of the screen (for example, upper 1/10 location as a safe area). If the number of persons is greater than 2, it may be undesirable to provide individual guides. In an embodiment of the present invention, it is assumed that a group guide is provided if the number of persons is greater than 2. In this case, the control unit 100 sets the photographing type to a group shot, and regards the face location of the group shot as fitted if all the persons are included in a predetermined area. However, the control unit 100 does not designate each face location.

The photographing type may be determined according to the face size, and a corresponding guide (single person guide, two persons guide, or group shot guide) is determined according to the determined photographing guide. The guide type may be determined from the above-described five photographing types. Among these photographing types, the close up shot, bust shot, and half shot are oriented to a photographing by focusing on persons, and the knee shot and full-length shot are oriented to a photographing by balancing a person and a background.

The control unit 100 detects when the number of persons is 1 at step 511, analyzes a face portion of corresponding person at step 513, and determines a photographing type according to the face portion at step 515. Specifically, the control unit 100 can determine a photographing type by analyzing a portion of body in the preview image by using the recognized face size in the face recognition process. For example, the control unit 100 identifies as a face oriented photo (self-portrait) whether the face occupies more than 60% of the screen, identifies as a background oriented photo whether the face occupies less than 10% of the screen, and identifies as a photo balanced between the face and background whether the face occupies 25%+/−5% of the screen. The control unit 100 can determine the photographing type according to the size of identified face as described above. The photographing type may be one of the five photographing types previously described.

Figure 6A:
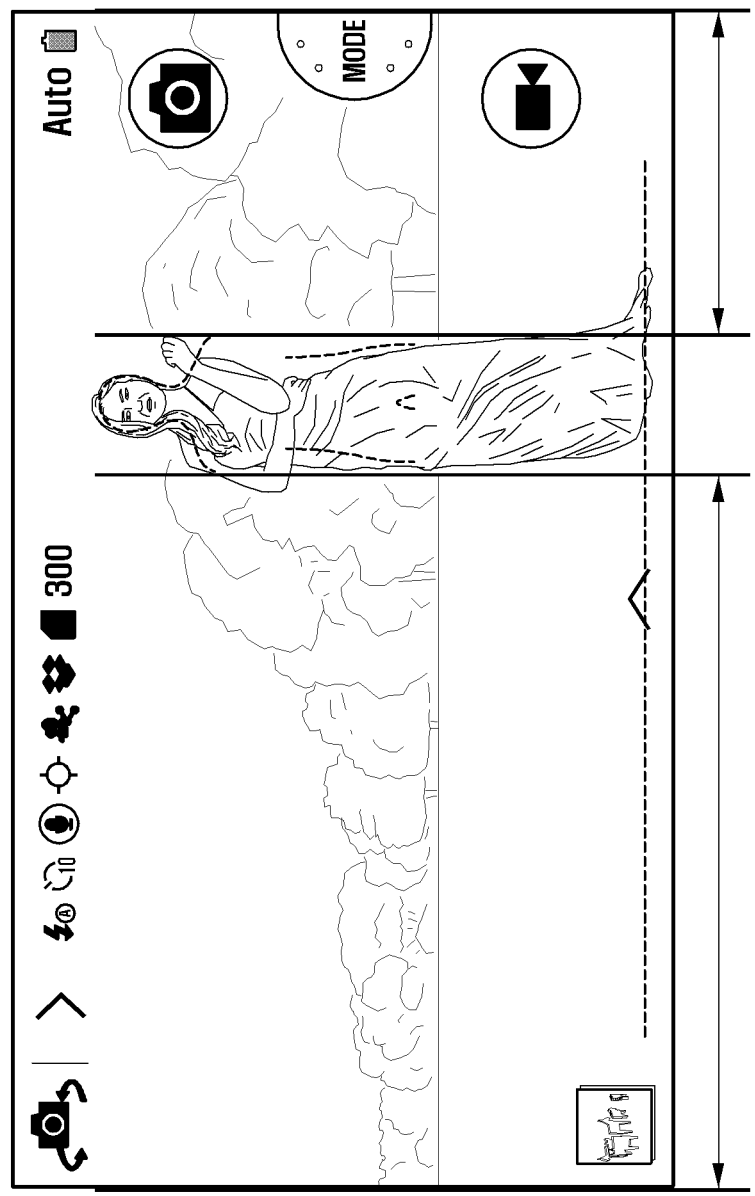
FIGS. 6A to 6D illustrate an example of determining and displaying a single person guide while performing the procedure of FIG. 5.
Figure 6B:
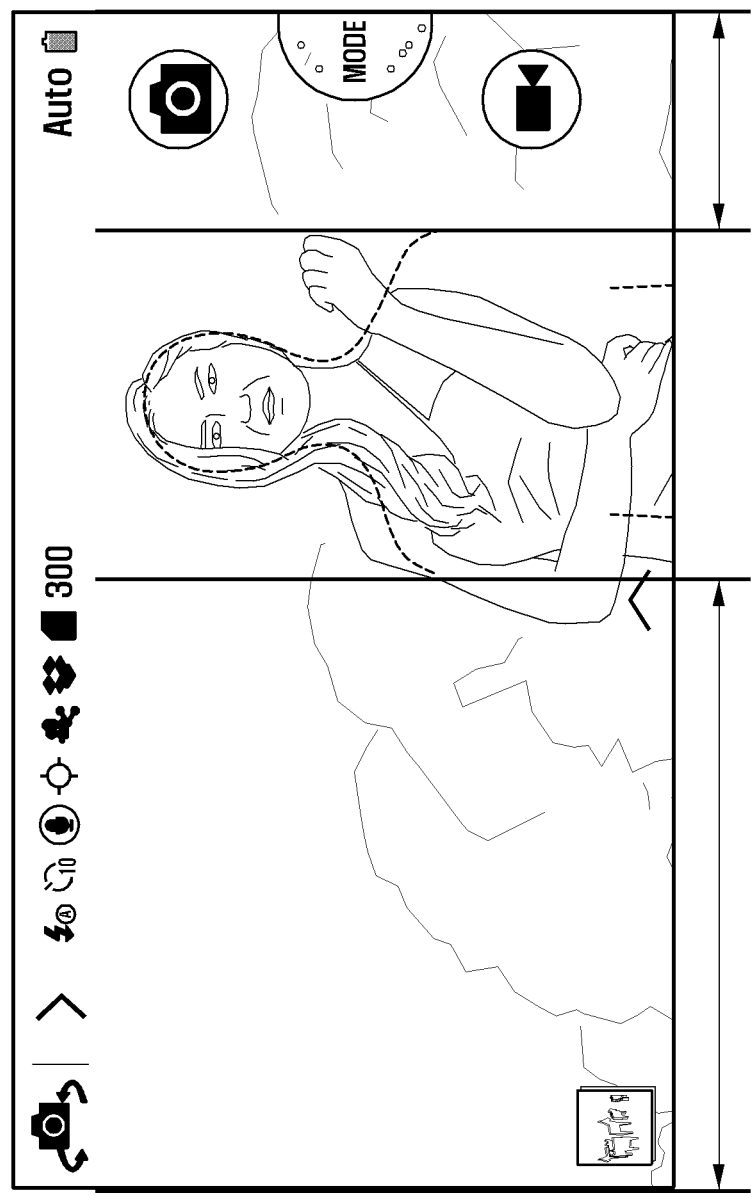
Figure 6C:
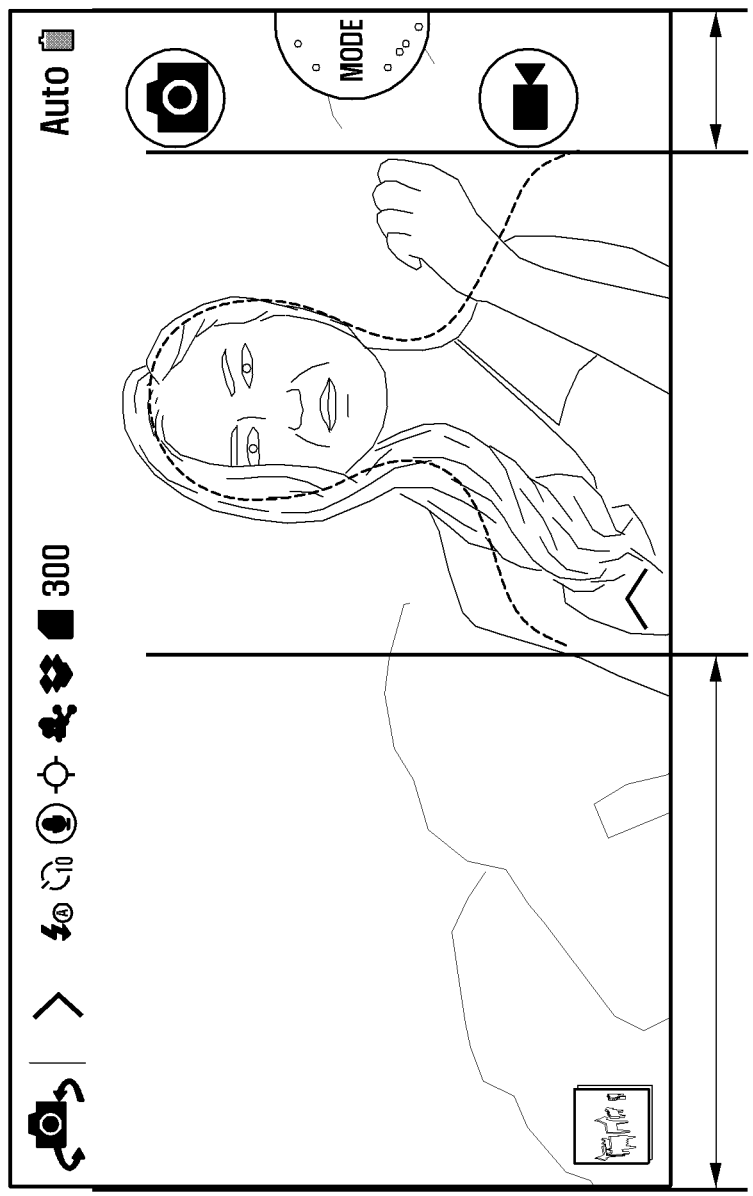
Figure 6D:
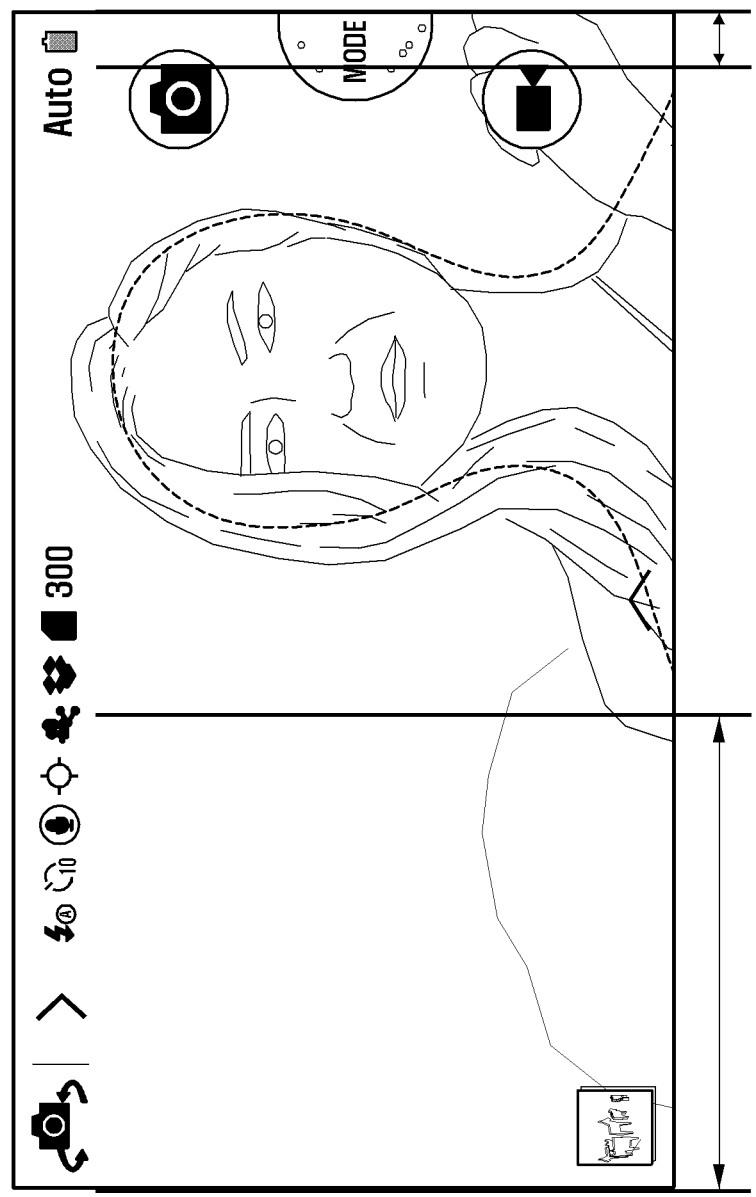

Subsequently, the control unit 100 determines a guide according to the determined photographing type at step 517. The upper and lower sides of the determined guide may be fixed in a screen of the display unit 130. FIGS. 6A to 6D illustrate examples of determining a guide according to the face size of 1 person in an image having a screen ratio of 16:9, and the guide is located at the right side of the screen. The guide may be determined to be located in the center or at the left side, if necessary. FIG. 6A illustrates an example of setting a guide in a full shot, FIG. 6B illustrates an example of setting a guide in a half shot, FIG. 6C illustrates an example of setting a guide in a bust shot, and FIG. 6D illustrates an example of setting guide in a close-up shot.

The control unit detects when the number of persons is 2 at step 521, analyzes face portions of corresponding persons at step 523, and determines a photographing type according to the face portions at step 525. The photographing type is determined by comprehensively considering the number of persons and face sizes. For example, the control unit 100 identifies as a face oriented photo whether the face of 1 person occupies more than 60% of the screen or the sum of faces of 2 persons occupies more than 60% of the screen, and identifies as a background oriented photo whether the face of 1 person occupies less than 5% of the screen. The control unit 100 then determines a photographing type according to the identified result at step 515. The photographing type may be one of the five photographing types previously described.

Subsequently, the control unit 100 determines a guide according to the determined photographing type at step 527. Here, guide lines including 2 persons are displayed in the screen of the display unit 130 maintaining a distance, and the upper and lower sides of the guide is adjusted according to the heights of the 2 persons. Specifically, locations of faces are identified as well as the sizes of the 2 persons in the face recognition process. The guide is determined by fixing the locations of the identified faces, and the location of the guide is set so that the head end of a taller person does not exceed a predetermined location.

Figure 7A:
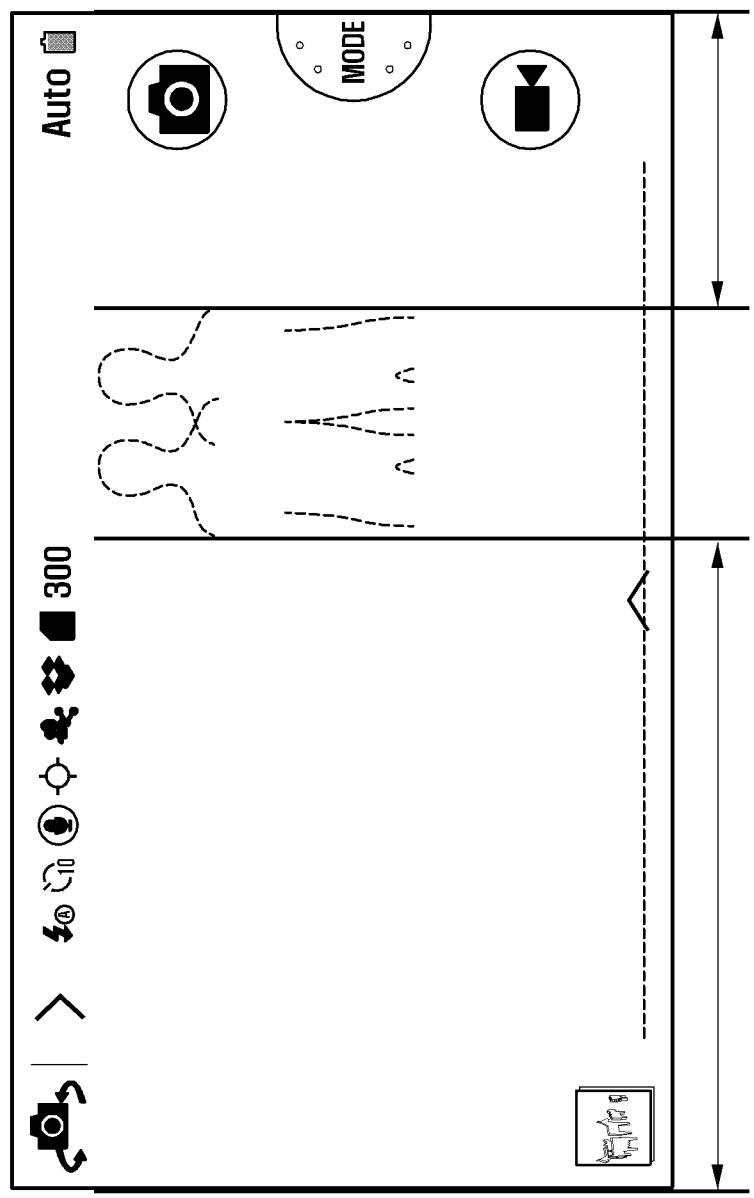
FIGS. 7A to 7D illustrate an example of determining and displaying a two persons guide while performing the procedure of FIG. 5.
Figure 7B:
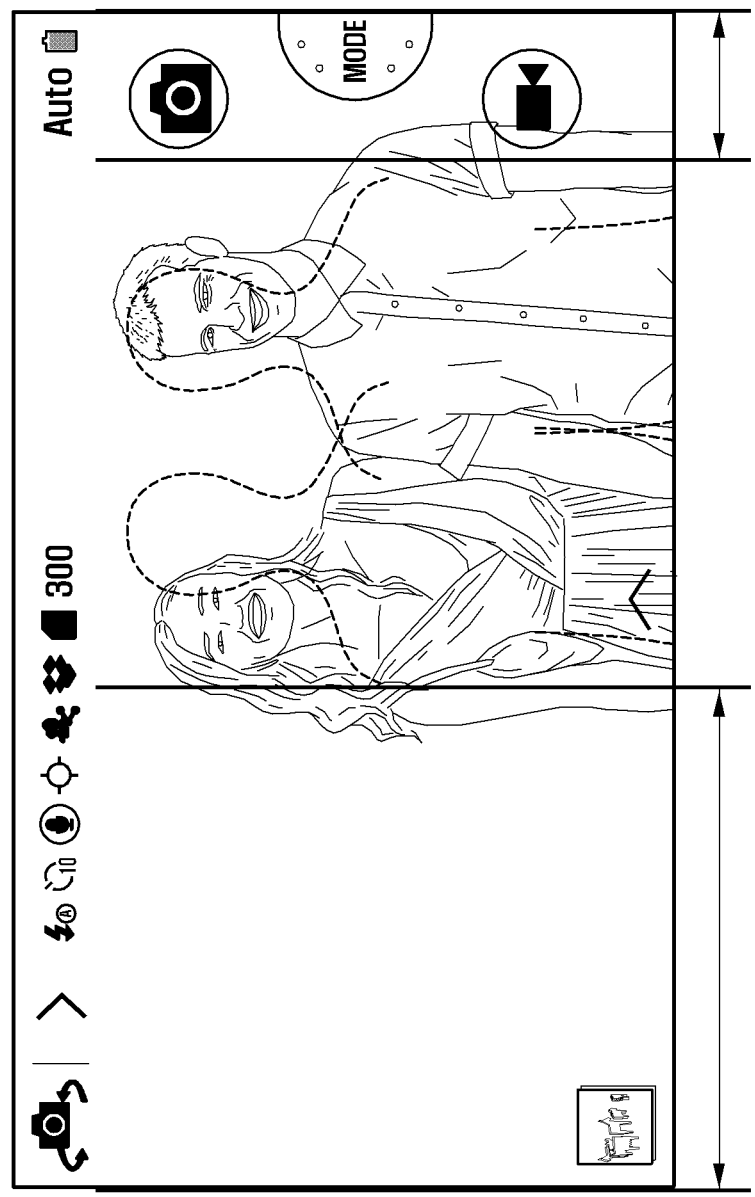
Figure 7C:
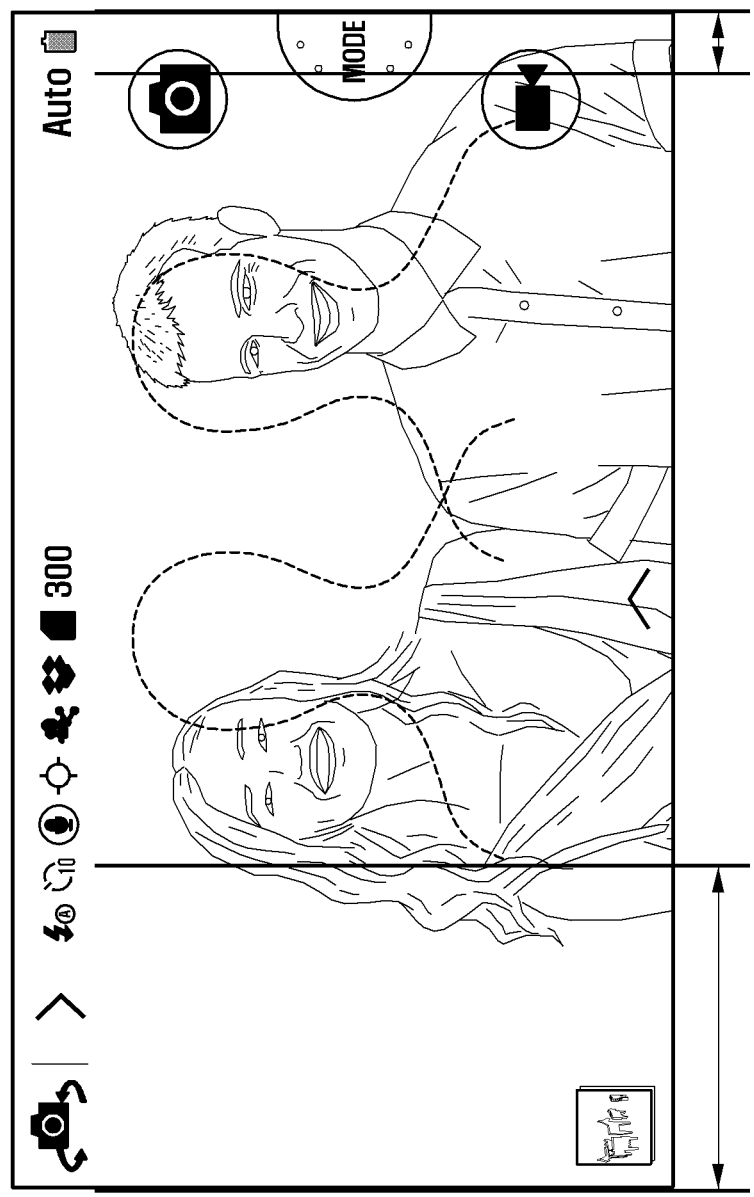
Figure 7D:
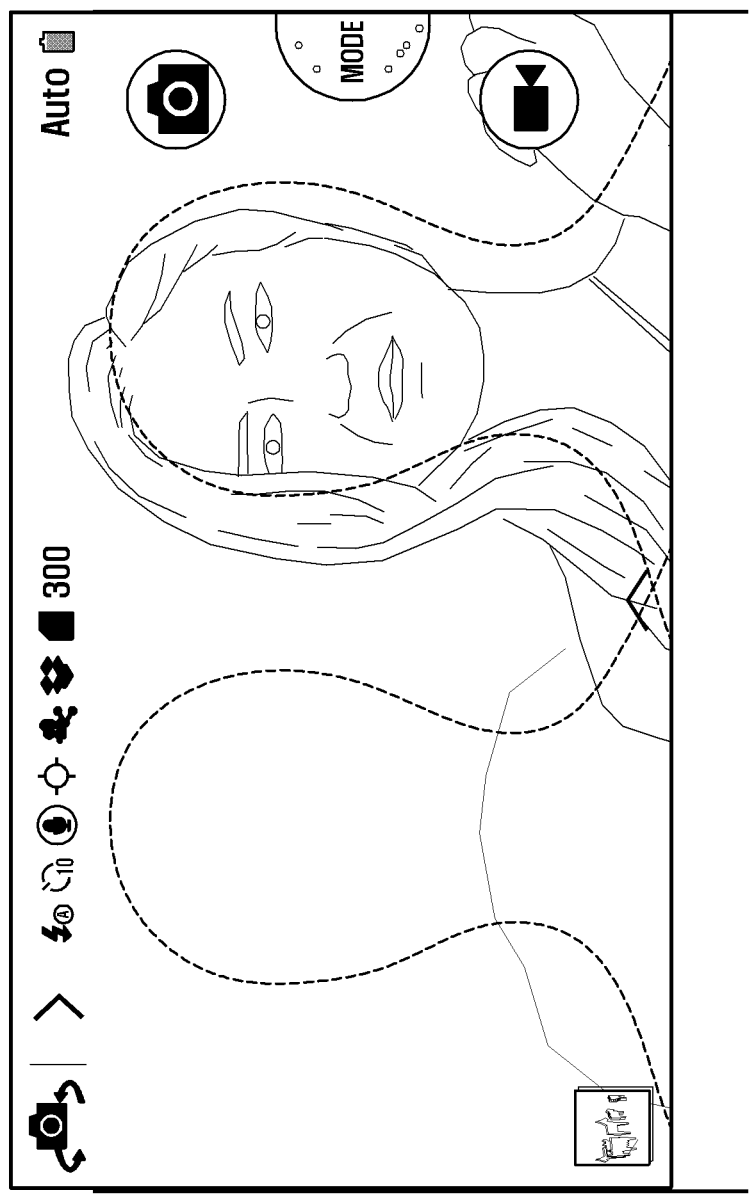

FIGS. 7A to 7D illustrate examples of determining a guide according to the face sizes of 2 persons in an image having a screen ratio of 16:9, and the guide is displayed at the right side of the screen. The guide may be set in the center or at the left side of the screen, if necessary. FIG. 7A illustrates a guide determined in a full shot, FIG. 7B illustrates a guide determined in a half shot, FIG. 7C illustrates a guide determined in a bust shot, and FIG. 7D illustrates a guide determined in a close-up shot.

The control unit 100 detects when the number of identified persons is greater than a predetermined value (more than 2 persons in an embodiment of the present invention) at step 531, analyzes face portions of each person at step 533, and determines a photographing type according to the face portions at step 535. The photographing type is determined by comprehensively considering the number of persons and face sizes. Subsequently, the control unit 100 determines a guide according to the determined photographing type at step 537. The group guide is displayed in a rectangular frame (group boundary) instead of as an individual guide, and the size of the rectangular frame is set to include all the faces of identified persons.

Figure 8:
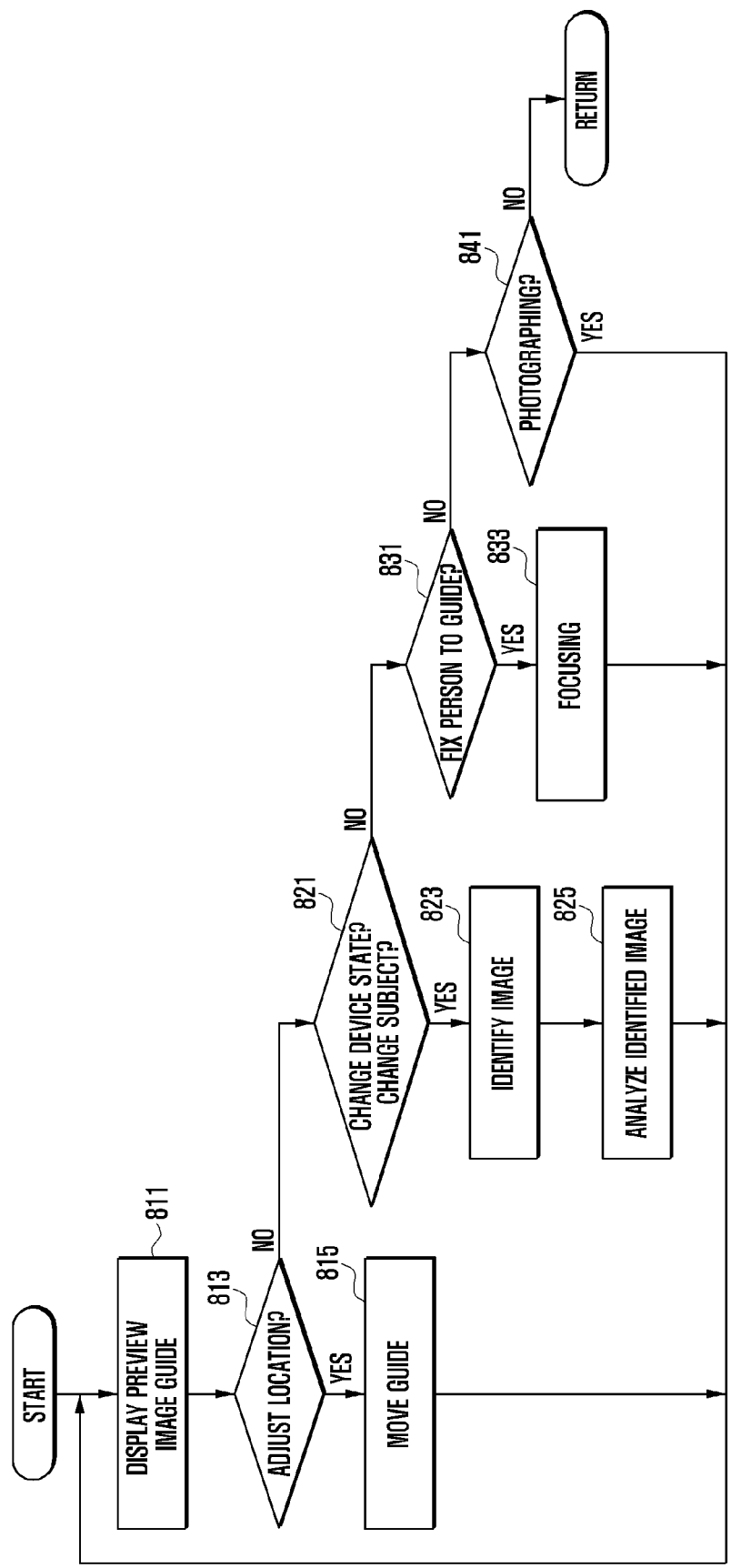
FIG. 8 illustrates a procedure of photographing an image by using a guide, according to an embodiment of the present invention.
Figure 9A:
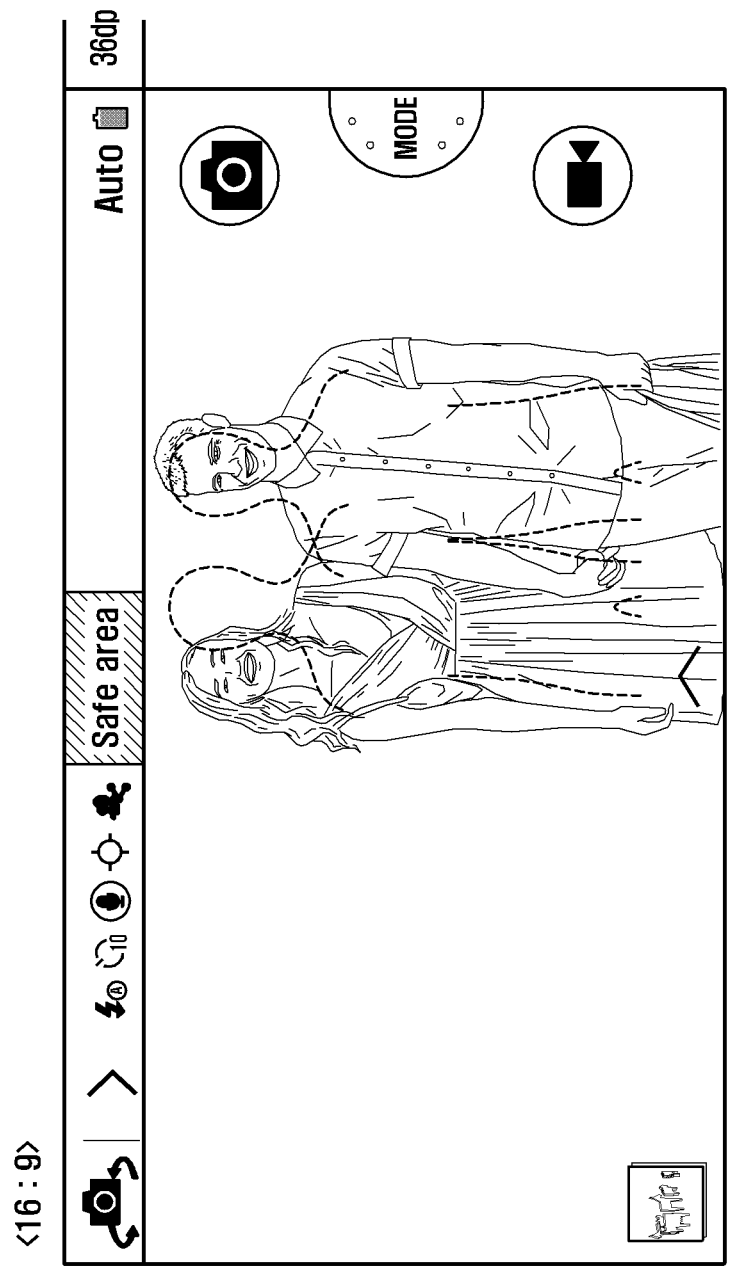
FIGS. 9A and 9B illustrate an example of displaying a determined guide, according to an embodiment of the present invention.
Figure 9B:
Figure 10A:
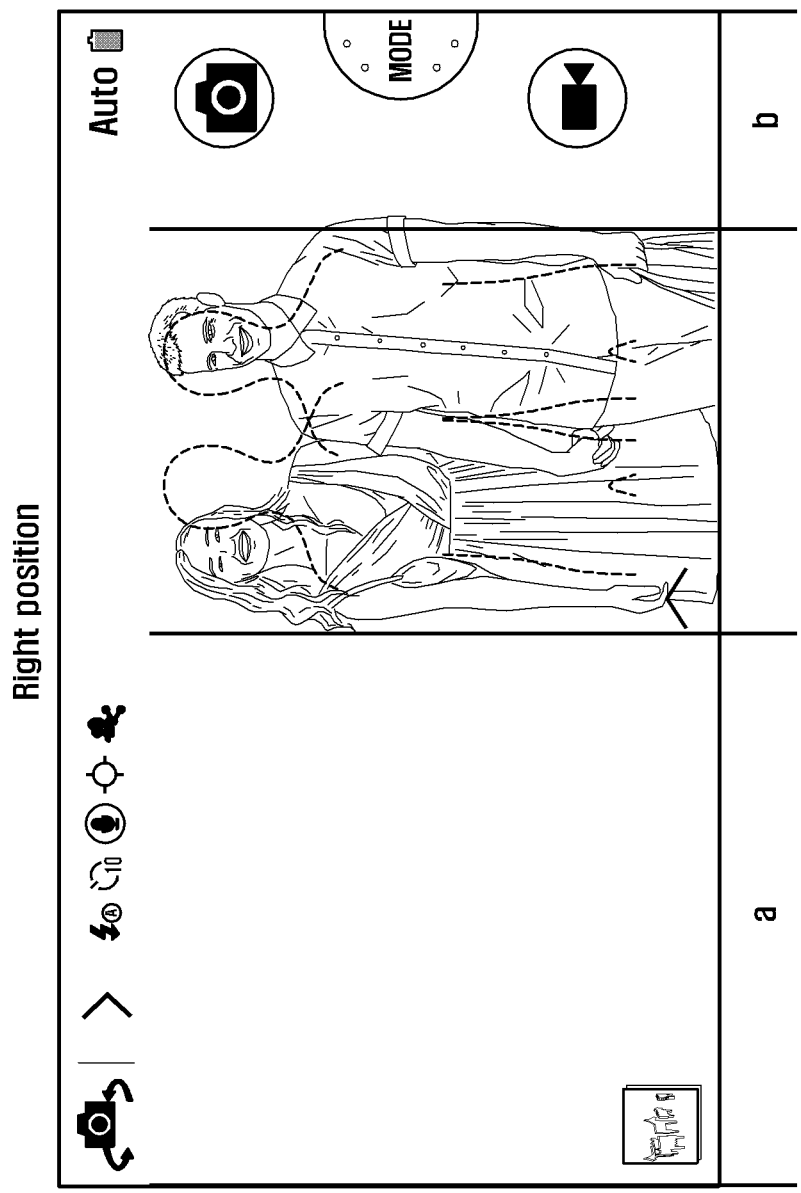
FIGS. 10A to 10C illustrate an example of a guide display location, according to an embodiment of the present invention.
Figure 10B:
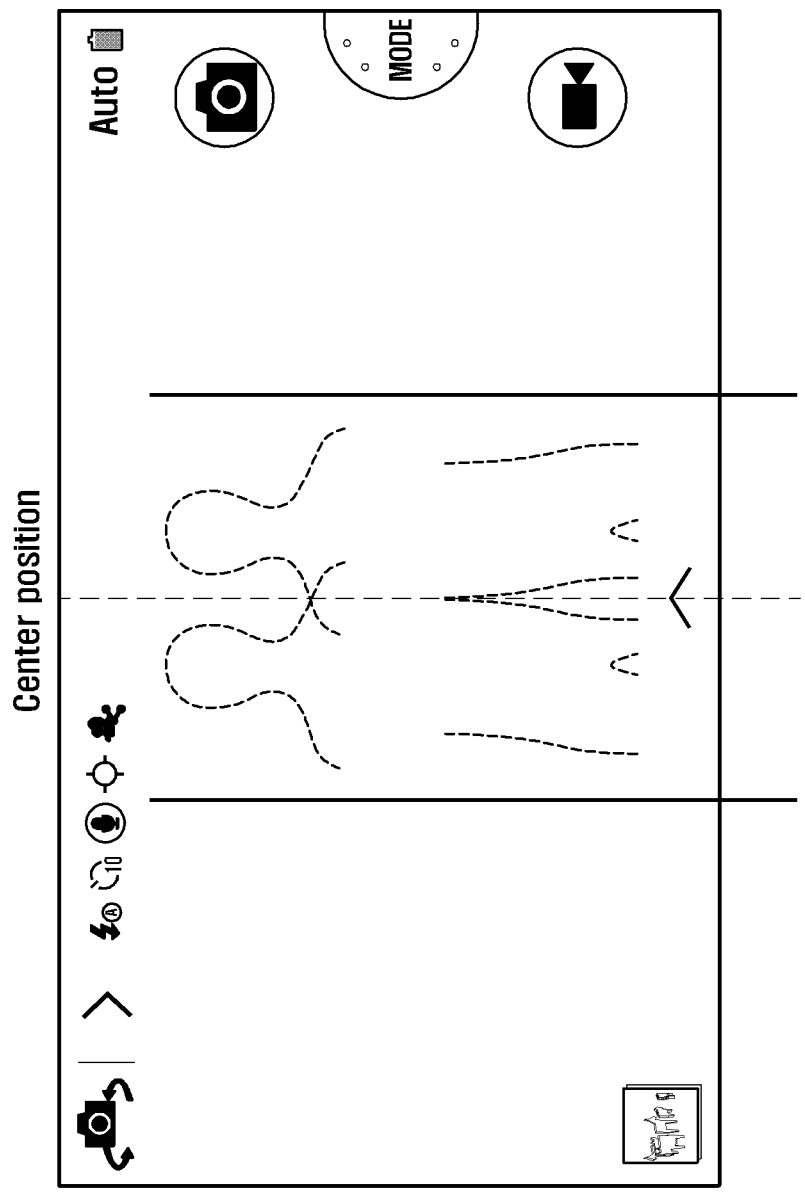
Figure 10C:
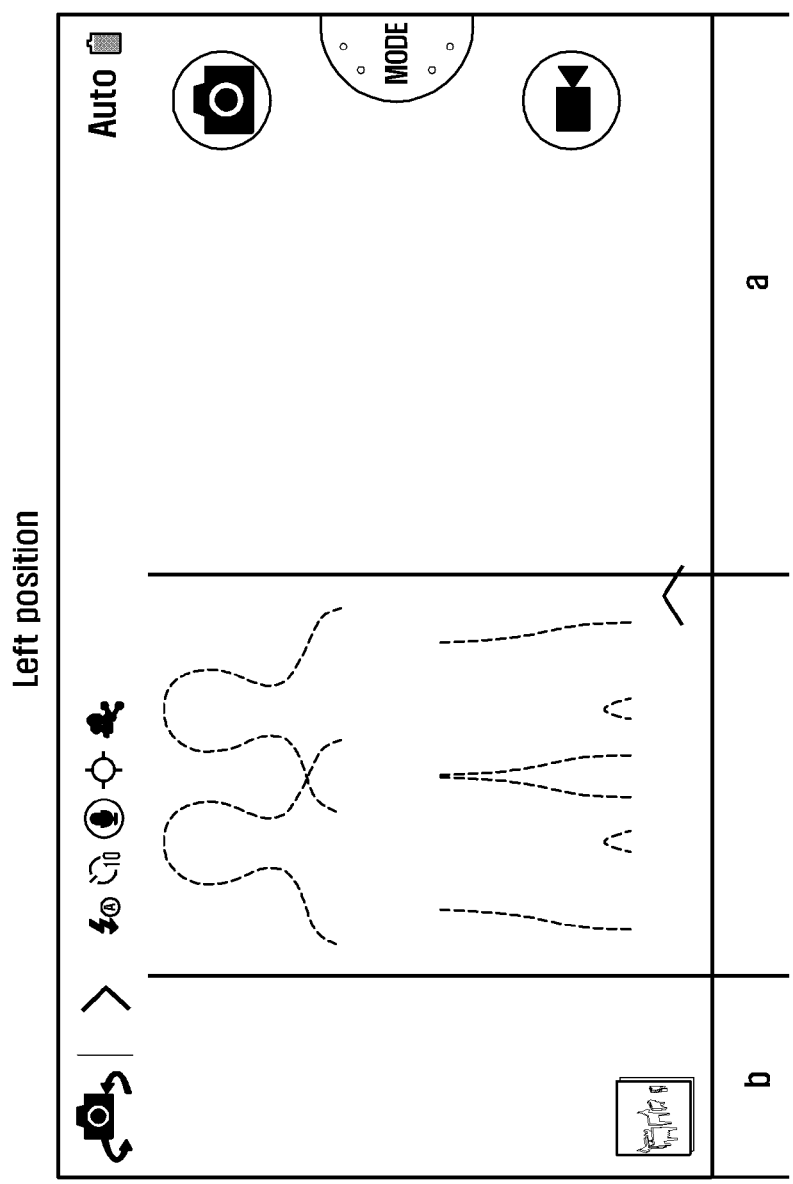
Figure 11A:
FIGS. 11A to 11C illustrate an example of photographing by using a guide, according to an embodiment of the present invention.
Figure 11B:
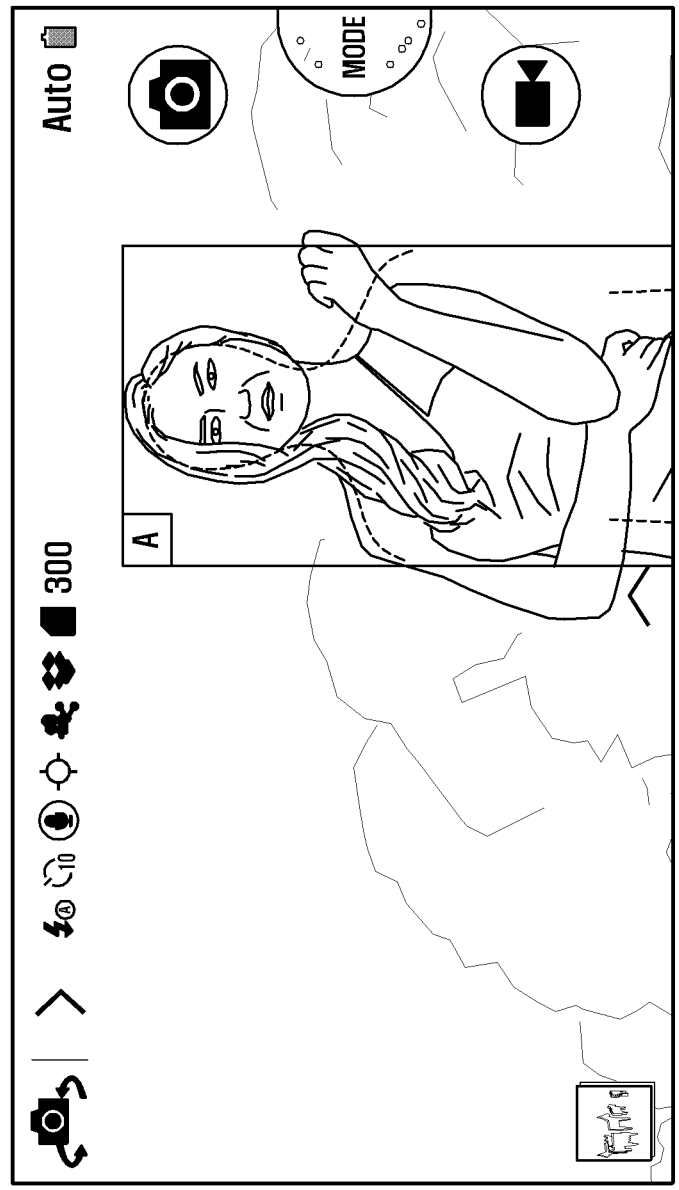
Figure 11C:
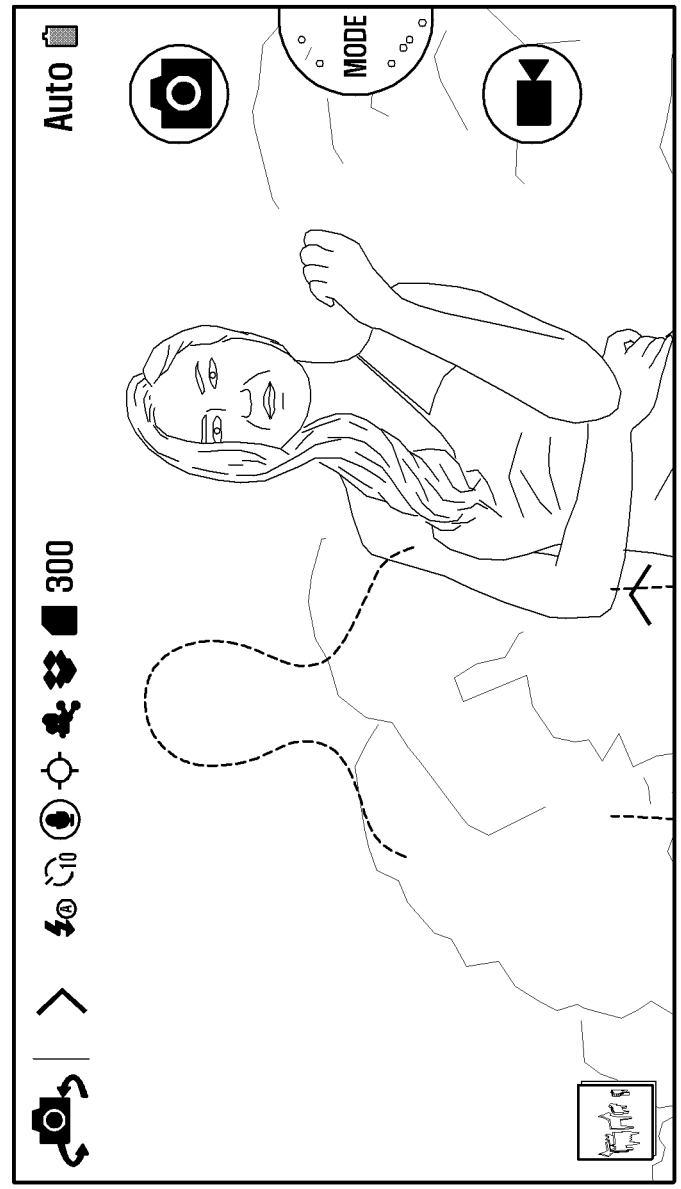

If the guide is determined as described above, the control unit 100 displays the determined guide in the preview image, and thereby, a user can photograph an image referring to the guide. FIG. 8 illustrates a procedure of photographing an image by using a guide, according to an embodiment of the present invention. FIGS. 9A and 9B illustrate an example of displaying a determined guide, FIGS. 10A to 10C illustrate an example of guide display location, and FIGS. 11A to 11C illustrate an example of photographing by using a guide.

Referring to FIGS. 8 to 11C, the control unit 100 displays a guide determined according to a display mode in the display unit 130. The display mode includes a landscape mode and a portrait mode as shown respectively in FIGS. 9A and 9B. The control unit 100 can identify the display mode from an output of the sensor 150, and display a guide determined according to the identified display mode in a preview image of the display unit 130 as shown in FIG. 9A or 9B.

The guide may be displayed in a predetermined location set as a default, and can be changed according to a user's selection. The guide display location may be right aligned as shown in FIG. 10A, center aligned as show in FIG. 10B, or left aligned as shown in FIG. 10C. The guide display location can be set in a setting menu or in the process of displaying a preview image. For adjusting the guide display location, the control unit 100 detects when a user selects (touches) a location when displaying the guide at step 813, and displays the guide in the corresponding location at step 815. The guide may be displayed in one of the forms shown in FIGS. 10A to 10C. The guide may be reversibly displayed in a left alignment or a right alignment, which is useful for stabilizing the composition of a subject in a photo.

The control unit 100 detects when the user rotates the camera device or the subject is changed in the above state at step 821, identifies a preview image as shown in FIG. 4 at step 823, and determines a guide by analyzing the image at step 825. Specifically, the control unit 100 re-performs the identification of preview image and decision of guide if the device state is changed (rotation, and zoom in/out) or the subject is changed (addition or removal of person in an image) when displaying the guide by overlaying the preview image.

The control unit 100 detects when an image of person is fixed in the guide when displaying the guide by overlaying the preview image at step 831, and performs a focusing operation by controlling the camera 120 at step 833. Specifically, if a person located out of the guide area as shown in FIG. 11A enters the guide area as shown in FIG. 11B, the control unit 100 detects this at step 831, and performs a focusing operation. If the focusing is performed in FIG. 11B, the control unit 100 can inform that the focusing has been completed on the guide area as shown in FIG. 11B. If the face of the person is no longer the guide area as shown in FIG. 11C, the control unit 100 returns to a previous state.

In the embodiment of the present invention, an image can be photographed automatically or manually when the focusing is completed as shown in FIG. 11B. If an automatic photographing is set, the control unit 100 performs the photographing if the focusing is maintained for a predetermined time as shown in FIG. 11B, at step 841. Specifically, if a timer is activated when maintaining the focusing and the predetermined time is elapsed, the control unit 100 regards the photographing as being accepted at step 223 of FIG. 2, and captures an image output by the camera 120 at step 225. Further, the control unit 100 detects when a user switches on a shutter button at step 841, the same as in step 223 of FIG. 2, and captures and stores an image output by the camera 120 in the storage unit 110 at step 225.

Figure 12:
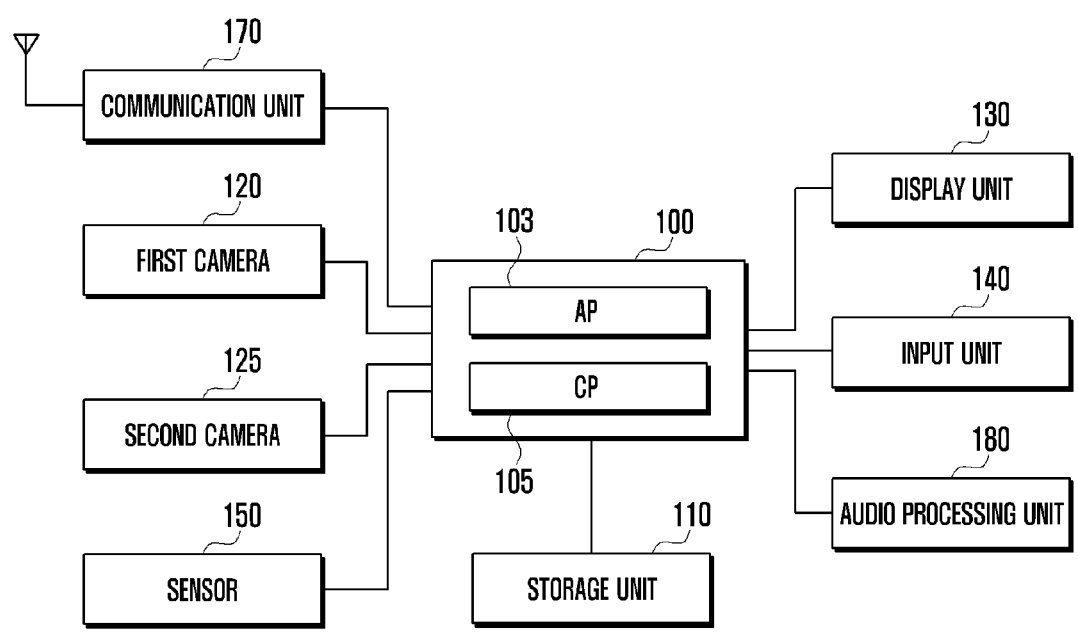
FIG. 12 illustrates a configuration of a portable terminal performing a photographing operation, according to an embodiment of the present invention.

FIG. 12 illustrates a configuration of portable terminal performing a photographing operation according to an embodiment of the present invention. The portable terminals may be various digital equipments such as a mobile phone including a smart phone, MP3 terminal, tablet, and computer.

Referring to FIG. 12, a communication unit 170 performs a function of communicating with a base station or an Internet server. The communication unit 170 may be configured with a transmitter for frequency up-converting and electrically amplifying a transmitting signal, and a receiver for low noise amplifying and frequency down-converting a received signal. The communication unit 170 may include an encoder (not shown) and a decoder (not shown). The encoder outputs a transmitting signal to the transmitter by encoding the signal and the decoder decodes a signal received by the receiver. The codec (encoder+decoder) may include Long Term Evolution (LTE), Wideband Code Division Multiple Access (WCDMA), Global System for Mobile Communications (GSM), WIFI, WIBRO, Near Field Communication (NFC), and Bluetooth®. In an embodiment of the present invention, it is assumed that the communication unit 170 includes LTE, WIFI, and Bluetooth®.

A camera 120 detects and outputs an image under the control of a control unit 100.

The control unit 100 controls the general operation of the portable terminal, and may include an Application Processor (AP) 103 for processing various applications of the portable terminal, and a Communication Processor (CP) 105 for controlling a communication function of the portable terminal. The application processing unit 103 performs a preview mode by controlling the camera 120 in a guide-photographing mode, according to an embodiment of the present invention, identifies a subject state and device state from the preview image, and determines and displays a guide in the preview image according to the identification result. The application processing unit 103 performs a focusing operation if a subject is located in the guide area when displaying the guide by overlaying the preview image, and captures and stores an image obtained by the camera 120 when photographing is requested.

A storage unit 110 may include a program memory (not shown) for storing an operation program of the terminal and programs according to the embodiments of the present invention, and a data memory (not shown) for storing tables for the operation of terminal and data generated during the execution of programs.

A display unit 130 may display information of an application being executed under the control of the control unit 100. The display unit 130 may display images of a main screen and a sub screen under the control of the control unit 100 in a dual image sensor mode. The display unit 130 may be an LCD or an OLED. An input unit 140 may be provided in a capacitive or resistive type, and can output location information of a user's touch (finger touch) to the control unit 100. The input unit 140 may further include an Electromagnetic Radiation (EMR) sensor pad, and can detect and output a pen touch input to the control unit 100. The display unit 130 and the input unit 140 may be integrally configured.

A sensor 150 may include various sensors for detecting a movement of the portable terminal, such as an acceleration sensor, geomagnetic sensor, gyro sensor, and/or location-detecting sensor. An audio processing unit 180 processes a voice signal generated in a communication mode under the control of the control unit 100.

In the portable terminal having the above configuration, if a request for driving the camera 120 is generated, the control unit 100 performs a preview mode. The control unit 100 performs a guide-photographing mode in the preview mode, and the guide-photographing mode can be set in a setting mode or in the preview mode.

If the guide-photographing mode is set, the control unit 100 determines a guide by identifying and analyzing a preview image output by the camera 120. In the identification of the image, the number of persons and face sizes of persons included in the image, background, and/or device state are identified. If faces are identified in the preview image, the control unit 100 identifies the number of persons and face sizes of the persons. Subsequently, the control unit 100 determines a photographing guide according to the number of identified persons and face sizes of the persons at step 219 of FIG. 2.

The photographing guide may use a background and a device state. The recognition of background is performed to identify an environment of a subject or object, and colors of the background image (for example, blue, sunset, white, and green). The recognition of background may also be performed to identify a background image (sceneries of indoors, and outdoors such as a seashore, mountain, garden, night view, water, sunset, and snow). The device state may be an inclination and/or rotation of the camera device, and the control unit 100 may determine an image display mode (landscape mode or portrait mode) according to the rotation of the device.

The control unit 100 may display a guide according to the number of persons and face sizes of the persons. Specifically, the control unit 100 may determine a photographing type (shot type) by using combinations of the face sizes and number of persons identified in the preview image, and display a guide according to the determined photographing type. The photographing type may be determined according to a face portion in the preview image. The photographing type may be a full shot (or full-length shot), knee shot (or medium shot), half shot (waist shot, or torso shot), bust shot, or close-up shot (or head shot). The control unit 100 determines the photographing type by analyzing the number of identified persons and face sizes of the persons. The control unit 100 determines an individual guide if the number of persons is less than a predetermined value (for example, 1 or 2 persons), and determines a group guide if the number of persons is greater than the predetermined value.

After determining the photographing guide by identifying and analyzing the preview image photographed by the camera 120, the control unit 100 displays the photographing guide by overlaying the preview image of the display unit 130 at step 221 in FIG. 2. If a user selects a location when displaying the guide, the control unit 100 displays the guide in the selected location. The guide may be displayed in a left alignment, center alignment, or left alignment. When the left or right alignment is used, the control unit 100 may reversibly display the guide. If the user rotates the camera device or a subject is changed in the above state, the control unit 100 re-performs the procedure of determining a guide by performing the processes of identifying a preview image, as shown in FIG. 4, and analyzing the image, as shown in FIG. 5.

If an image of person is fixed in the guide when overlaying the guide on the preview image, the control unit 100 performs a focusing operation, and displays the image if the focusing is completed. When focusing the subject, the control unit 100 can automatically or manually photograph the image. If an automatic photographing is set, the control unit 100 captures the image output by the camera 120 if the focusing is maintained for a predetermined time. If the user switches on a shutter button, the control unit 100 captures an image output by the camera 120 and stores the captured image in the storage unit 110.

The above photographing guide method may be useful for self-camera photographing. In the self-camera photographing method, a user photographs an image without looking through the display unit 130 or a view finder. In this case, the control unit 100 determines a guide by identifying a subject (face area of person) and analyzing the identified result. The control unit 100 displays the determined guide, and performs an automatic photographing by controlling the camera 120 if a person is located in the guide.

The control unit 100 may guide a photographing operation through the audio processing unit 180. In self portrait photographing, the control unit 100 may provide a user with an instruction for a correct position through the audio processing unit 180 if the face is located out of a predetermined area. For example, if the face is located too far to the left, the control unit 100 may guide the user with voice information instructing the user to move the face to the right. The control unit 100 may provide a voice instruction by recognizing the face of the person, for example, "B, your face is too far to the right. Come closer to A". If the subject is located at a correct position, the control unit 100 may inform the user through the audio processing unit 180 that the subject is correctly positioned. In the automatic photographing mode, the control unit 100 may take a photo after instructing the subject person not to move from the correct position.

The control unit 100 may also improve the visibility of an active guide for an effective information transmission by displaying the guide in a color contrasting to the color of the preview image. For example, the control unit 100 may display the guide in a complementary color to the color of the preview image, or may use a method of distinguishing the guide and the preview image by processing in a shadow form.

Although certain embodiments of the present invention have been described in detail hereinabove, it should be understood that many variations and modifications of the basic inventive concept described herein will still fall within the spirit and scope of the disclosure as defined in the appended claims.

What is claimed is:

1. A method for photographing an image using a photographing guide, the method comprising:
    displaying a preview image;
    identifying a face size and a shape of hair of a subject included in the preview image;
    identifying a gender of the subject based on the identified face size and shape of hair of the subject;
    determining a photographing type based on the identified gender of the subject;
    determining a guide based on the determined photographing type;
    displaying the determined guide by overlaying the guide on the preview image; and
    capturing an image output by a camera, if the photographing is requested, using the guide.

2. The method of claim 1, wherein determining the photographing type comprises:
    analyzing the identified face size and a screen portion; and
    determining a photographing type based on the analyzed screen portion.

3. The method of claim 2, wherein identifying the face size comprises identifying the number of persons, and wherein displaying the guide comprises displaying the guide according to the determined photographing type and the number of persons after determining the photographing type based on the number of persons and the face size.

4. The method of claim 3, wherein displaying the determined guide comprises displaying as an individual guide when the number of persons is 1 or 2, and displaying as a group shot guide when the number of persons is greater than 2.

5. The method of claim 4, wherein the photographing type is one of a full shot including an entire area of a body, a knee shot including an area from a knee to a face, a half shot including an area from a waist to the face, a bust shot including an area from a bust to the face, and a close-up shot including the face.

6. The method of claim 3, wherein displaying the determined guide further includes auto-focusing the subject when the subject is located in the guide area.

7. The method of claim 3, wherein the guide is one of a left alignment, and a right alignment, the guide is displayed at a location selected in a display unit, and the guide includes a right alignment or a left alignment and is reversible.

8. The method of claim 3, wherein the guide is displayed by fixing a vertical location of the guide when the number of persons is 1, and by adjusting the vertical location according to a height of a tallest of 2 persons if the number of persons is 2.

9. The method of claim 3, wherein capturing the image comprises automatically capturing the image if the subject is fixed in the guide area longer than a predetermined time.

10. An apparatus, comprising:
a camera configured to detect and output an image;
a display configured to display a preview image and a guide;
a memory configured to store a captured image; and
a processor configured to:
identify a face size and a shape of hair of a subject included in the image output by the camera in a preview mode;
identify a gender of the subject based on the identified face size and shape of hair of the subject;
determine a photographing type based on the identified gender of the subject;
determine the guide based on the determined photographing type;
control the display to display the determined guide by overlaying the guide on the preview image; and
capture and store the image output by the camera if the photographing is requested, using the guide.

11. The apparatus of claim 10, wherein the processor is further configured to analyze the identified face size and a screen portion, and determine a photographing type based on the analyzed screen portion.

12. The apparatus of claim 11, wherein the processor is further configured to identify a number of persons, determine a photographing type based on the number of persons and the face size, and control the display to display the guide according to the photographing type and the number of persons.

13. The apparatus of claim 12, wherein the processor is further configured to control the display to display an individual guide when the number of persons is 1 or 2, and display a group shot guide when the number of persons is greater than 2.

14. The apparatus of claim 13, wherein the photographing type is one of a full shot including an entire area of a body, a knee shot including an area from a knee to a face, a half shot including an area from a waist to the face, a bust shot including an area from a bust to the face, and a close-up shot including the face.

15. The apparatus of claim 12, wherein the processor is further configured to display the guide in a left alignment or a right alignment, display the guide at a location selected by a user, and display a right alignment or a left alignment of the guide in a reversible form.

* * * * *